United States Patent Office 3,132,923
Patented May 12, 1964

3,132,923
METHOD IN EVAPORATION AND BURNING OF WASTE SULPHITE LIQUOR
Axel Fredrik Scholander, Alfredshem, Sweden, assignor to Aktiebolaget Rosenblads Patenter, Stockholm, Sweden, a corporation of Sweden
No Drawing. Filed Oct. 6, 1959, Ser. No. 844,616
Claims priority, application Sweden Oct. 14, 1958
4 Claims. (Cl. 23—122)

This invention relates to indirect evaporation of waste sulphite liquor containing calcium as base, with subsequent burning of the evaporated liquor.

It is already known that if such a liquor be evaporated, mixed with active crystallisation nucleus or seed crystals of calcium sulphate precipitation of scales from the liquor onto the heating surfaces of the evaporator may be avoided, since such scales are instead precipitated on the crystallisation nucleus or seed crystals. Hitherto, this result has been achieved by the so-called inoculating method in which the liquor, before entering the heating surface exposed to scale precipitation is inoculated with such crystallisation nucleus from an external source, for instance from a supply independent of the evaporation. Of course, this method is involved with great costs. It is also possible to separate off sludge precipitated from the liquor during the course of the evaporation, and to collect such precipitation for inoculation into the liquor to be supplied to the evaporator, but this method entails costs for a comprehensive separation apparatus.

The main object of the invention is to perform the evaporation, while utilizing the burning step, without additional costs and with the same effect as in the known inoculation process. In first line the method according to the invention is characterized by the feature that ashes obtained by burning the liquor is admixed to the liquor to be evaporated whereby calcium sulphate, mainly in the form of dihydrate, will be precipitated in said liquor.

The ashes obtained contain calcium in the form of carbonate, oxide and sulphate but no active inoculation crystals. Thus, the addition of the ashes is not equivalent with the known inoculation methods. On the other hand, the addition of ashes results in the same final effect as said known methods since the admixture with the liquor causes an increase of the pH-value and of the contents of Ca so that such crystals in the form of calcium sulphate will precipitate in the liquor after the admixture.

The desired result is also achieved without the aforesaid additional costs because the ashes which otherwise are a product of no value produced in great quantities in any case must be extracted from the burning process separately in order to be as little detrimental to the surroundings as possible.

The effect may be improved by supplying, in addition to the ashes, a very restricted quantity (0.1 to 10 parts per million; p.p.m.) of active silica which appears to absorb precipitated calcium sulphate. In the same manner, it is advantageous to admix the ashes to partially evaporated liquor. The admixture may be effected either to the whole quantity of liquor which is being evaporated, or to a portion of the liquor which subsequently is admixed to the remaining portion.

It is proved to be suitable to supply a sufficient quantity of ashes to maintain the pH-value of the liquor between 2 and 5, preferably between 2.5 and 4, during the evaporation.

*Example*

In a plant for indirect evaporation of stripped beer from the recovery of alcohol from calcium bisulphite waste liquor from the digestion of spruce and for burning the evaporated beer the evaporation process was performed in a thermo-recompression evaporator in accordance with the so-called channel switching method. The beer was evaporated from 10 to 54 percent by weight of dry substances at 105.4° C. heated by means of its vapor recompressed to a pressure corresponding to a saturation temperature of 126.8° C. The heating steam and the beer were periodically switched to exchange passageways with each other through the evaporator for the purpose of causing the condensate from the heating steam during each period between switching operations, to remove any scale precipitated on the heating surface from the beer during the preceding period.

However, it was found that owing to the heavy scale formation the evaporation could not be operated continuously but had to be interrupted at relatively short intervals for additional cleaning with $SO_2$-water although the switching operations were performed every eight hours. In that way an average evaporation capacity of 19,600 kg./h. evaporated water could be upheld between cleaning operations.

Now, according to the invention the beer to be evaporated was mixed with ashes from the burning of the evaporated beer, such ashes containing 25.4% CaO, 58.8% $CaSO_4$, 8.6% $CaCO_3$ and 7.2% not specified substances. 176 kg./h. of those ashes were mixed with 3120 kg./h. beer. This mixture was pumped to the evaporator into which the main part of the beer to be evaporated was fed directly. During this period the beer to be evaporated contained 9.45% dry substance and was evaporated to a concentration of 55% dry substance.

The following result was established:

The evaporator could be operated continuously with an interval of 24 h. between the switching operations without additional cleaning. The rate of recompression could be lowered to give a pressure corresponding to a saturation temperature of 120.5°. In these circumstances the evaporation capacity increased to 22.4 t./h.

What I claim is:

1. In a method in which waste sulphite liquor containing calcium as a cation is concentrated by evaporation in an indirect evaporator and the thus concentrated liquor is burnt to obtain its heat value leaving ashes as a resultant by-product, the improvement, devoid of additional material cost, which comprises eliminating the formation of incrustations from said liquor on the heating surfaces of the evaporator by admixing such by-product ashes with more of the same liquor to be evaporated thereby forming inoculation particles of sulphate in the form of dihydrate in said mixture, and evaporating said liquor from said mixture while keeping the heating surfaces of said evaporator clean by the presence of said dihydrate.

2. A method as in claim 1 wherein the supply of ashes to the liquor is adjusted so as to maintain the pH-value of the liquor between 2 and 5, preferably between 2.5 and 4, during the evaporation.

3. A method as in claim 1, wherein the ashes are admixed to a portion of the liquor to be evaporated, said portion subsequently being supplied to the remaining portion of said liquor.

4. A method as in claim 1, and partially evaporating said more liquor prior to admixing said ashes therewith.

References Cited in the file of this patent

UNITED STATES PATENTS

| | | |
|---|---|---|
| 1,399,845 | Bull | Dec. 13, 1921 |
| 2,334,621 | Goodell | Nov. 16, 1943 |
| 2,801,900 | Benning et al. | Aug. 6, 1957 |
| 2,872,289 | Samuelson | Feb. 3, 1959 |